United States Patent
Takusagawa et al.

(10) Patent No.: US 8,412,184 B2
(45) Date of Patent: Apr. 2, 2013

(54) COMMUNICATION SWITCHING METHOD IN COMMUNICATION SYSTEM

(75) Inventors: Hideaki Takusagawa, Yokohama (JP);
Keiichi Nakatsugawa, Kawasaki (JP);
Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1421 days.

(21) Appl. No.: 12/046,634

(22) Filed: Mar. 12, 2008

(65) Prior Publication Data
US 2008/0153443 A1    Jun. 26, 2008

Related U.S. Application Data

(63) Continuation of application No. PCT/JP2005/018032, filed on Sep. 29, 2005.

(51) Int. Cl.
*H04W 4/00* (2009.01)
*H04W 40/00* (2009.01)

(52) U.S. Cl. .................... 455/426.1; 455/445

(58) Field of Classification Search ............... 455/561, 455/550.1, 426.1; 370/445, 452.1, 229, 256, 370/338
See application file for complete search history.

(56) References Cited

U.S. PATENT DOCUMENTS

| 7,818,026 | B2* | 10/2010 | Hartikainen et al. ...... 455/550.1 |
| 2002/0052183 | A1 | 5/2002 | Tokoro |
| 2002/0150228 | A1* | 10/2002 | Umeda et al. ............. 379/220.01 |
| 2005/0018706 | A1 | 1/2005 | Myojo |
| 2005/0114646 | A1 | 5/2005 | Rekimoto et al. |
| 2006/0068825 | A1* | 3/2006 | Iochi ............................ 455/522 |

FOREIGN PATENT DOCUMENTS

| JP | 11-234642 | 8/1999 |
| JP | 2003-319462 | 11/2003 |
| JP | 2004-104653 | 4/2004 |
| JP | 2005-45330 | 2/2005 |
| WO | 02/15630 | 2/2002 |

OTHER PUBLICATIONS

International Search Report dated Jan. 24, 2006, from the corresponding International Application.
"New Technology—Cooperation of Information Devices in Support of Ubiquitous Society—"Task Computing"" Fujitsu Journal, No. 278, Feb. 2005.

* cited by examiner

*Primary Examiner* — Michael Faragalla
(74) *Attorney, Agent, or Firm* — Katten Muchin Rosenman LLP

(57) ABSTRACT

Upon detection of an environmental change in a neighborhood, a cellular phone makes selections of a communication device and a communication path, which are used for a communication. A communication packet transmitted from a communication corresponding terminal is distributed to the cellular phone that is the destination of the communication packet, and a PC physically positioned in the neighborhood of the cellular phone, according to the results of the selections, thereby switching from a communication using only the cellular phone to a communication using both the cellular phone and the PC.

14 Claims, 16 Drawing Sheets

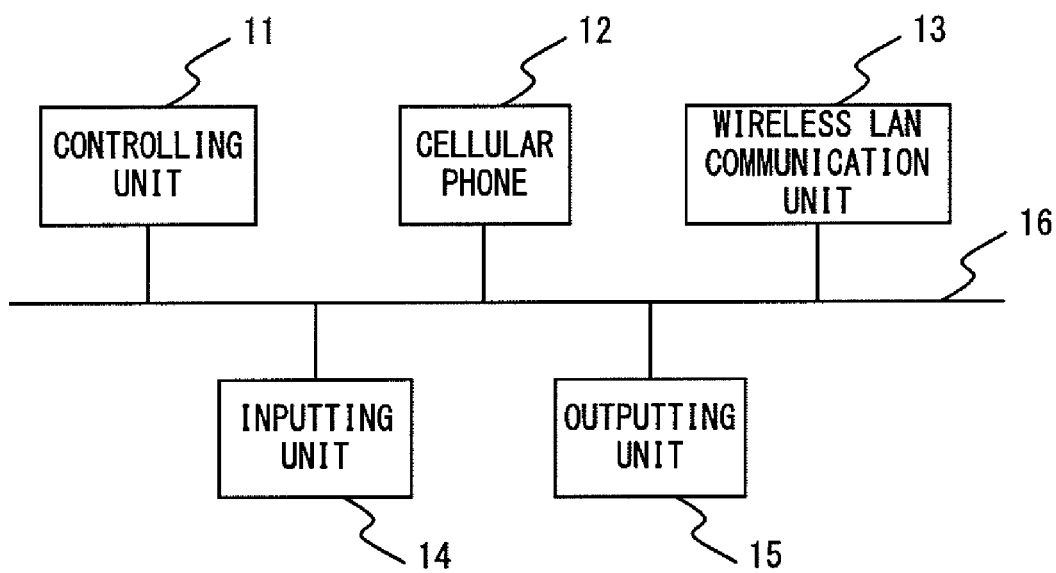
F I G. 4

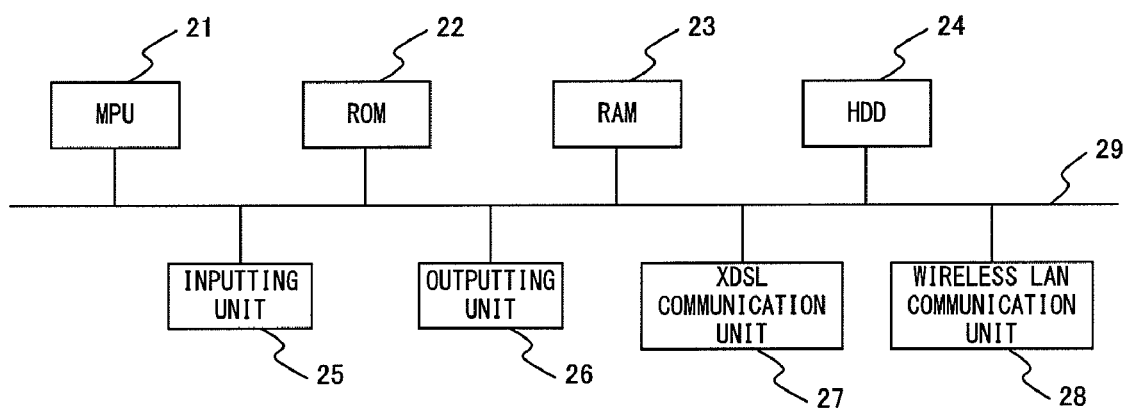
F I G. 5

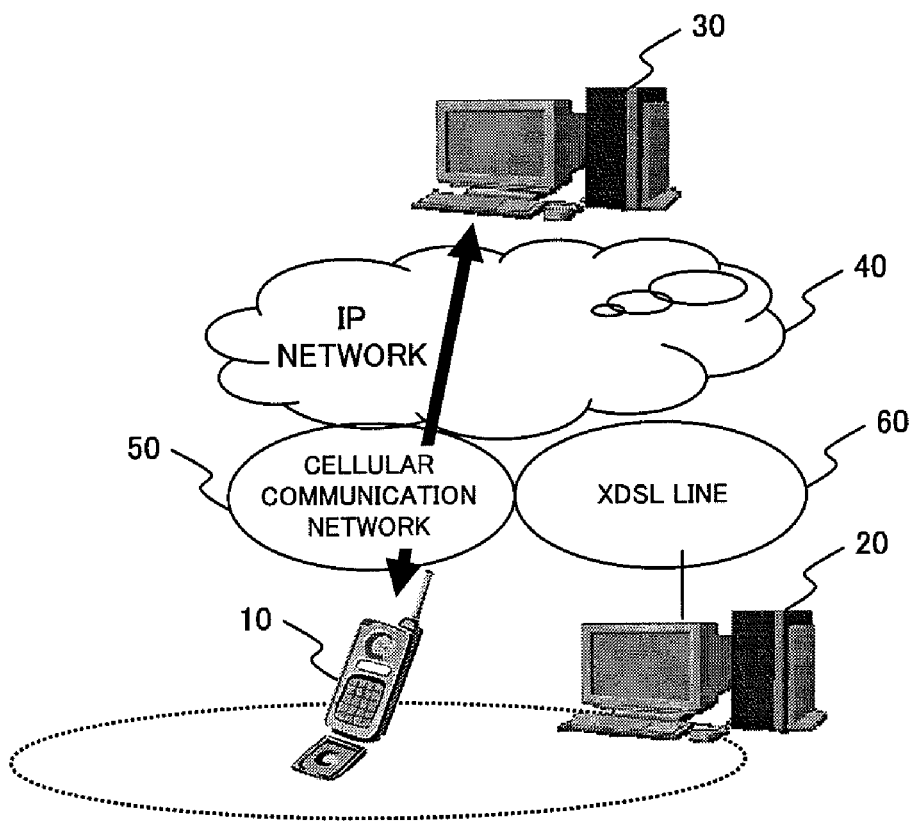
F I G. 6

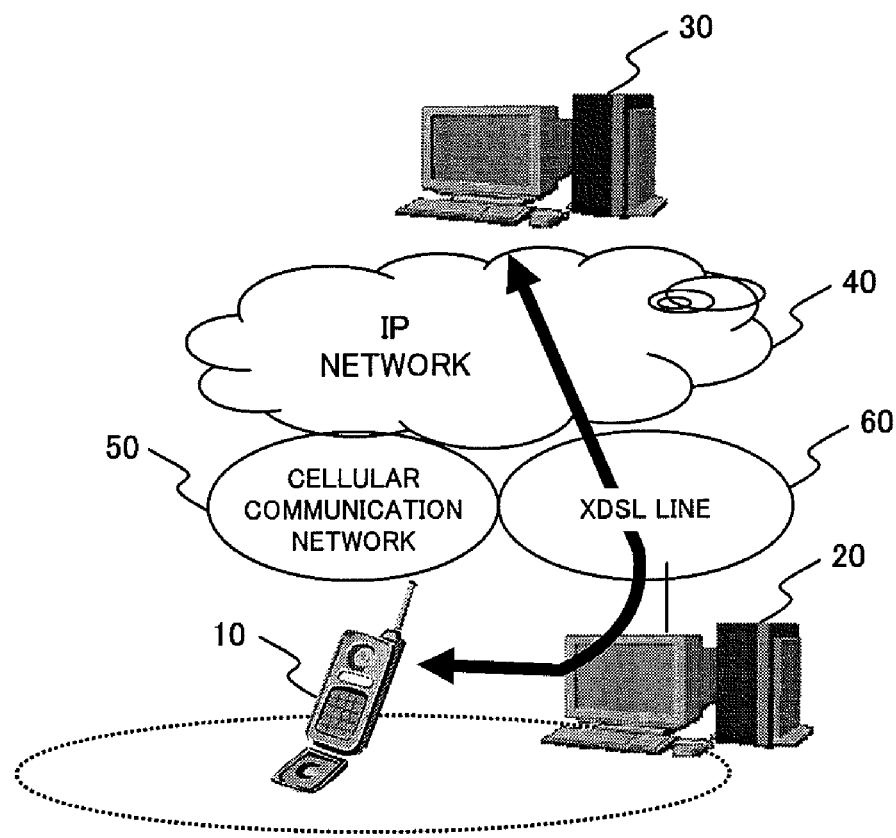
F I G. 7

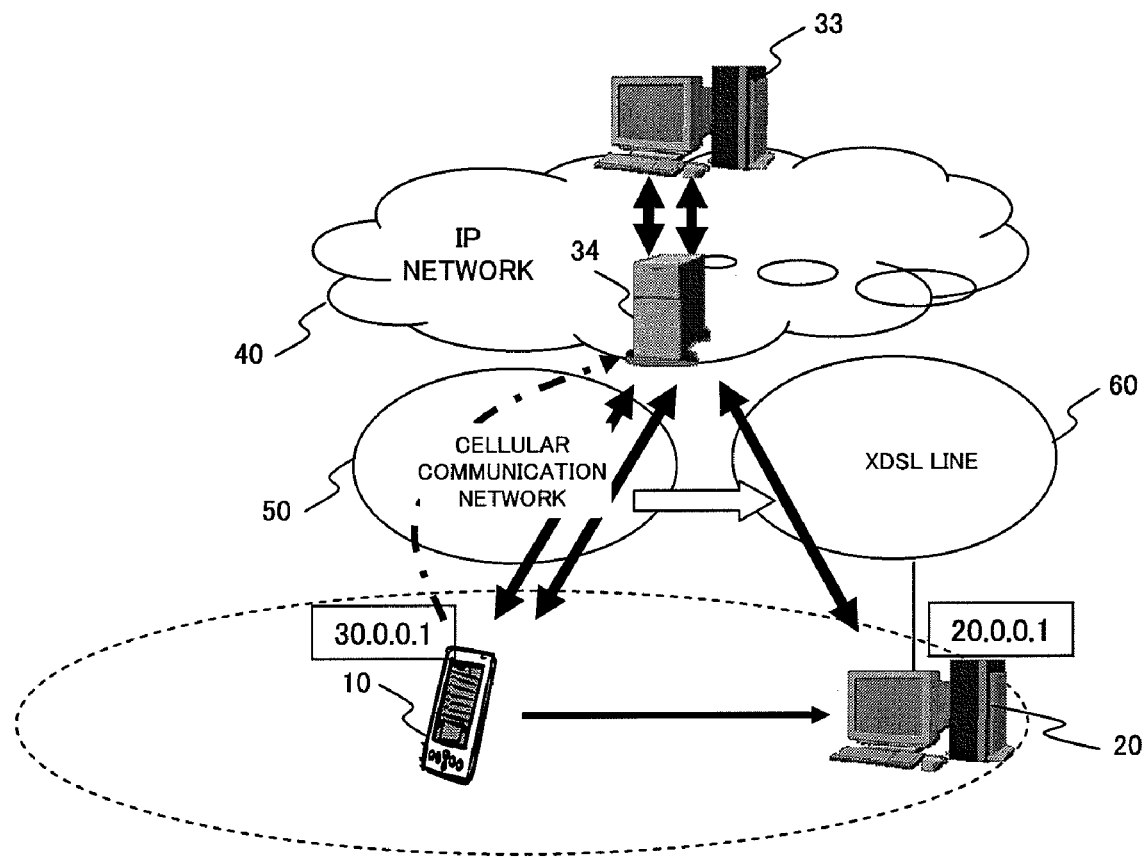
F I G. 15

COMMUNICATION SWITCHING METHOD IN COMMUNICATION SYSTEM

CROSS REFERENCE TO RELATED APPLICATION

This application is a continuation application of international PCT application No. PCT/JP2005/018032 filed on Sep. 29, 2005.

BACKGROUND OF THE INVENTION

1. Field of the Invention

The present invention relates to a communication technique, and more particularly, to a technique for switching a communication device to be used in a ubiquitous environment where pluralities of communication devices, which are connectable to a communication network, exist in a neighborhood.

2. Description of the Related Art

In recent years, communication devices such as a personal computer, a cellular phone, an Internet appliance, etc., which are connectable to a global IP network such as the Internet, etc., have been rapidly increasing. Additionally, connecting means for connecting such a network and communication devices has diversified into an xDSL line, a CATV network, a LAN, a cellular communication network, etc. In the meantime, near field communication standards such as RFID (Radio Frequency Identification), an ad hoc network of a wireless LAN, etc., PLC (Power Line Communication), Bluetooth (registered trademark), Zigbee (registered trademark), UWB (Ultra Wide Band), and the like have been proposed as communication standards for implementing a communication between other communication devices existing in the neighborhood of one communication device. Communication devices, which support both a global IP communication function and a near field communication function, are expected to increase in the future.

In a future ubiquitous environment, a situation in which pluralities of such communication devices having a network connection function exist around a user is quite conceivable. For example, in a user home environment, appliances such as a personal computer, a telephone, a TV receiver, a stereo set, a PDA, a cellular phone, etc. can be cited as such communication devices. These communication devices individually have different properties in terms of the performance of a processor, a memory, etc., an input/output function such as a display, a touch panel, etc., an installed application, and the like. Accordingly, it is preferable that each communication device is freely cooperative with a peripheral communication device (hereinafter referred to as a neighboring communication device) according to a user's purpose (for example, a videophone conversation, or the like) and can effectively use the neighboring communication device. Additionally, a user should desire to continually utilize an application in use even if an available neighboring communication device changes due to a factor such as a user move, etc. To satisfy such a demand, a technique for making a communication device dynamically cooperate with a plurality of neighboring communication devices becomes essential to a future ubiquitous society.

As a technique related to cooperation with a neighboring communication device, for example, Document 1, International Application Publication Pamphlet under the PCT WO02/15630, proposes the "device seamless" technique for seamlessly switching a communication device used by a user according to a user move or a change in a communication environment. With this technique, for example, a communication that a user makes with a personal computer is switched to a cellular phone when the user goes out.

Additionally, Document 2, New Technology, Information Device Cooperative "Task Computing" supporting a ubiquitous society, Fujitsu Journal February/March issue (No. 278), 2005, Fujitsu Co., Ltd., discloses the "task computing" technique proposed by Fujitsu Laboratories Ltd. With this technique, neighboring devices are freely combined and used. For example, an image received with a cellular phone is displayed on a neighboring television.

Furthermore, as the technique related to the present invention, for example, Document 3, Japanese Published Unexamined Patent Application No. 2005-45330, discloses the technique for improving communication efficiency by controlling the transmission/reception timings of wireless communication modules of mutually different wireless communication methods.

With the "device seamless" technique disclosed by the above described Document 1, a seamless device uses only one device at one time. Therefore, the effect of device cooperation is restricted to the performance, the input/output function, and the network connection function of one device even in an environment where pluralities of devices are available. This problem is further described with reference to FIG. 1.

In FIG. 1, a user can use a cellular phone 1000 and a personal computer (PC) 2000 as communication devices, and utilizes a service rendered by a server 3000 with the use of these communication devices. Here, both a cellular communication network 1100 that the cellular phone 1000 uses for a communication, and an xDSL line 2100 that the PC 2000 uses for a communication are connected to an IP network 3100. Various types of data are exchanged with the server 3000 via the IP network 3100.

Considered is a case where a videophone communication service that the PC 2000 receives from the server 3000 is used by being switched to the cellular phone 1000 and where the voice input/output convenience is superior to the PC 2000 in this environment. An illustration on the left side of FIG. 1 shows a state before being switched, whereas an illustration on the right side of FIG. 1 shows a state after being switched.

In the videophone communication service, a user must exchange both a voice data packet 3001 and an image data packet 3002, which are communication packets, with the server 3000 by using a communication device. However, a seamless device uses only one device at one time with the above described device seamless technique. Therefore, processes for exchanging the voice data packet 3001 and the image data packet 3002 are switched from the PC 2000 to the cellular phone 1000 if a communication device is switched. Accordingly, a large display of the PC 2000, which is expected to provide a more satisfactory image quality than the cellular phone 1000 in the display of an image represented with the image data packet 3002, or the xDSL line 2100 that has a communication capacity that is higher than the cellular communication network 1100 cannot be effectively utilized.

In the meantime, with the "task computing" technique disclosed by the above described Document 2, a plurality of devices can be used at the same time. However, the use of a network connection made by a communication device existing in the neighborhood of a user is not taken into account. This problem is further described with reference to FIG. 2.

In FIG. 2, a cellular phone 1000, a PC 2000, a server 3000, a cellular communication network 1100, an xDSL line 2100, and an IP network 2100 are similar to those shown in FIG. 1.

With the "task computing" technique, the cellular phone 1000 can make the PC 2000 to execute a task for displaying an image represented with an image data packet 3002 on the large display of the PC 2000 by transferring the image data packet 3002 among a voice data packet 3001 and the image data packet 3002, which are transmitted from the server 3000, if communication device switching, which is similar to that described with reference to FIG. 1, is made. Also with this technique, however, the xDSL line 2100 available to the PC 2000 is not utilized, and a user can receive a videophone communication service only within the scope of a communication cost, a communication rate, the degree of network congestion, the quality of radio waves, and a QoS (Quality of Service) function, of cellular communication network 1100.

As described above, neither the "device seamless" technique nor the "task computing" technique enables a plurality of network resources across communication devices to be effectively utilized when communication devices comprising a global IP communication function exist in the neighborhood of a user.

SUMMARY OF THE INVENTION

The present invention was developed in light of the above described problems, and an object thereof is to make a plurality of network resources across communication devices effectively available in an environment where a plurality of communication devices are available.

A communication switching method in one aspect of the present invention is a method for switching a communication in a communication made by a communication system having a plurality of communication devices, and characterized in comprising detecting an environmental change in a communication device by the communication device, making selections of a communication device and a communication path, which are used for a communication, by the communication device that detects the environmental change, and switching a communication using only a destination communication device to a communication using a plurality of communication devices by distributing a communication packet, which is transmitted from a communication corresponding terminal, to the destination communication device indicated in the communication packet, and a neighboring communication device physically located in the neighborhood of the destination communication device based on result of the selections.

A communication packet is distributed according to an environmental change as described above, whereby network resources, which are respectively comprised by the destination communication device and the neighboring communication device, can be effectively utilized.

In the above described communication switching method according to the present invention, the neighboring communication device is, for example, a communication device that can directly exchange a communication packet with the destination communication device.

Additionally, in the above described communication switching method according to the present invention, all of a change in the neighboring communication device, a change in the state of a communication network to which the communication device that detects the environmental change is connected, and a change in the state of an application running in the communication device can be detected in the detection of the environmental change.

In this way, the above described communication switching is made by taking such changes as a cue.

Furthermore, in the above described communication switching method according to the present invention, the selections of the communication device and the communication path may be made based on any one or more of a property of each communication device, a property of a communication network to which each communication device is connected, and a property of a communication application running in each communication device.

The selections are made based on the above described properties, whereby suitable selections can be made according to these properties.

Here, the above described property of each communication device includes, for example, any one or more of the processing performance of each communication device, an input/output function comprised by each communication device, and a communication application installed in each communication device.

Still further, the above described property of the communication network to which each communication device is connected includes, for example, any one or more of the state of a connection to the communication network in each communication device, a communication cost when the communication network is used, a communication rate available to each communication device in the communication network, the state of a transfer path connecting each communication device and a communication network, and the presence/absence of a transfer function of a communication packet in each communication device.

Still further, the above described property of the communication application running in each communication device includes, for example, any one or more of whether or not the play of each flow type to be processed by the communication application can be made in each communication device, and a communication band required for the communication application.

Still further, in the above described communication switching method according to the present invention, the neighboring communication device may transfer the communication packet, which is distributed to the neighboring communication device, to the destination communication device in the communication using the plurality of communication devices.

In this way, the neighboring communication device functions as a relay device of a communication packet to the destination communication device, whereby network resources comprised by the neighboring communication device are effectively utilized.

Still further, in the above described communication switching method according to the present invention, the neighboring communication device may terminate the communication packet, which is distributed to the neighboring communication device and addressed to the destination communication device, in the communication using the plurality of communication devices.

In this way, the neighboring communication device functions as a terminating device of a communication packet to the destination communication device, whereby network resources comprised by the neighboring communication device are effectively utilized.

Still further, in the above described communication switching method according to the present invention, the destination communication device may transfer the communication packet, which is distributed to the destination communication device, to the neighboring communication device in the communication using the plurality of communication devices.

In this way, the destination communication device transfers a communication packet to the neighboring communication device as a relay device, whereby also an application in the neighboring communication device, the processing performance of which is higher than the destination communication device, can be applied.

Still further, in the above described communication switching method according to the present invention, the selections of the communication device and the communication path may be made for each user using each communication device, for each communication application, or for each flow type to be processed by the communication application.

In this way, the above described selections are suitably made for each user, for each communication application, or for each flow type, whereby network resources are more effectively utilized.

Still further, in the above described communication switching method according to the present invention, the distribution of the communication packet may be made by using a packet identifier indicated in the communication packet.

In this way, network resources can be effectively utilized without taking any special measures on the side of a communication corresponding terminal.

At this time, the distribution can be made by using at least one or more of, for example, a layer 2 address, a layer 3 address, a port number, a QoS field, and a session ID, which are indicated in the communication packet, as the packet identifier.

A communication system in another aspect of the present invention is a communication system having a plurality of communication devices, and characterized in comprising a detecting unit for detecting an environmental change in a communication device, a selecting unit for making selections of a communication device and a communication path, which are used for a communication, according to the detection of the environmental change, and a switching unit for switching a communication using only a destination communication device to a communication using a plurality of communication devices by distributing a communication packet, which is transmitted from a communication corresponding terminal, to the destination communication device indicated in the communication packet, and a neighboring communication device physically located in the neighborhood of the destination communication device based on results of the selection.

With the communication system having the above described configuration, a communication packet is distributed according to an environmental change, whereby network resources, which are respectively comprised by the destination communication device and the neighboring communication device, can be effectively utilized.

A communication device in a further aspect of the present invention is a communication device in a communication system having a plurality of communication devices, and characterized in comprising a detecting unit for detecting an environmental change in the communication device, a selecting unit for making selections of a communication device and a communication path, which are used for a communication, according to the detection of the environmental change, and a switching instructing unit for causing a communication using only a destination communication device to be switched to a communication using a plurality of communication devices by issuing an instruction to distribute a communication packet, which is transmitted from a communication corresponding terminal, to the destination communication device indicated in the communication packet, and a neighboring communication device physically located in the neighborhood of the destination communication device based on results of the selections.

With the communication system comprising the communication device having the above described configuration, a communication packet is distributed according to an environmental change, whereby network resources, which are respectively comprised by the destination communication device and the neighboring communication device, can be effectively utilized.

As described above, the present invention produces an effect that a plurality of network resources across communication devices can be effectively utilized in an environment where pluralities of communication devices are available.

BRIEF DESCRIPTION OF DRAWINGS

FIG. 4 is a block diagram showing a configuration of a cellular phone shown in FIG. 3;

FIG. 5 is a block diagram showing a configuration of a personal computer shown in FIG. 3;

FIG. 6 is a schematic showing an example of an autonomous type communication path in the communication system shown in FIG. 3;

FIG. 7 is a schematic showing an example of a dependent type communication path in the communication system shown in FIG. 3;

FIG. 15 is a schematic showing result of the selections of a communication device and a communication path, which are made according to an implementation example 4.

DESCRIPTION OF THE PREFERRED EMBODIMENTS

Preferred embodiments according to the present invention are described below with reference to the drawings.

Figure 1:
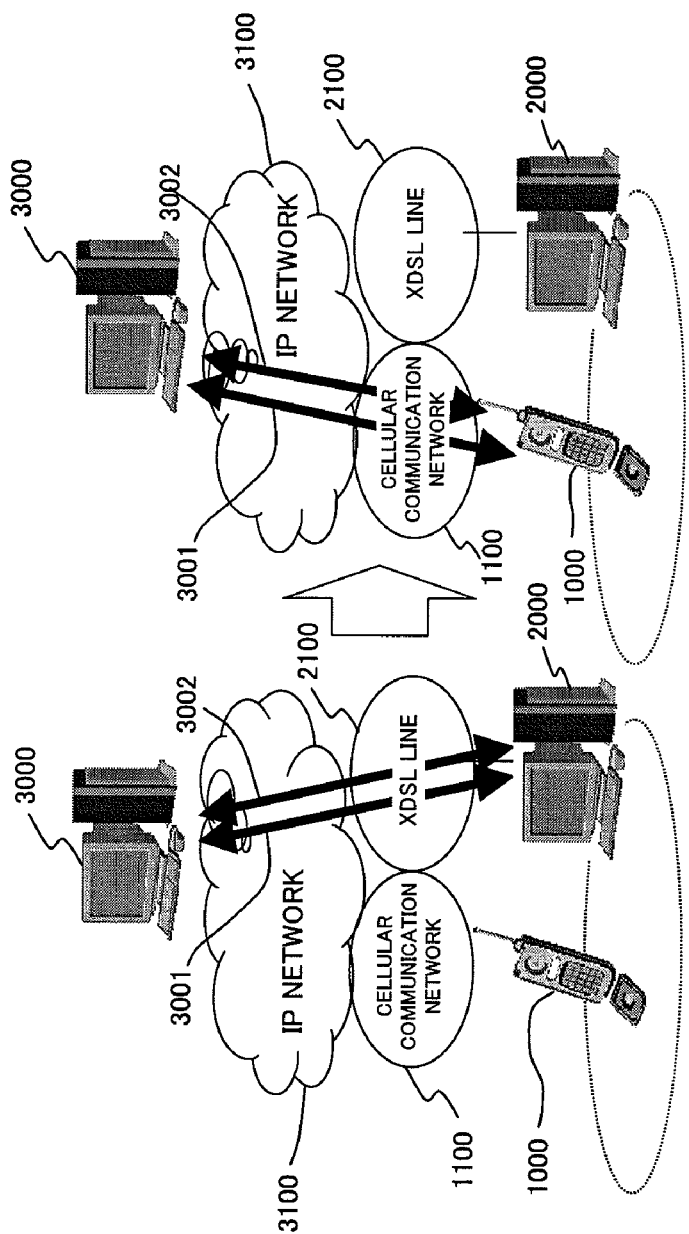
FIG. 1 is a schematic (No. 1) explaining a problem of a conventional technique.
Figure 2:
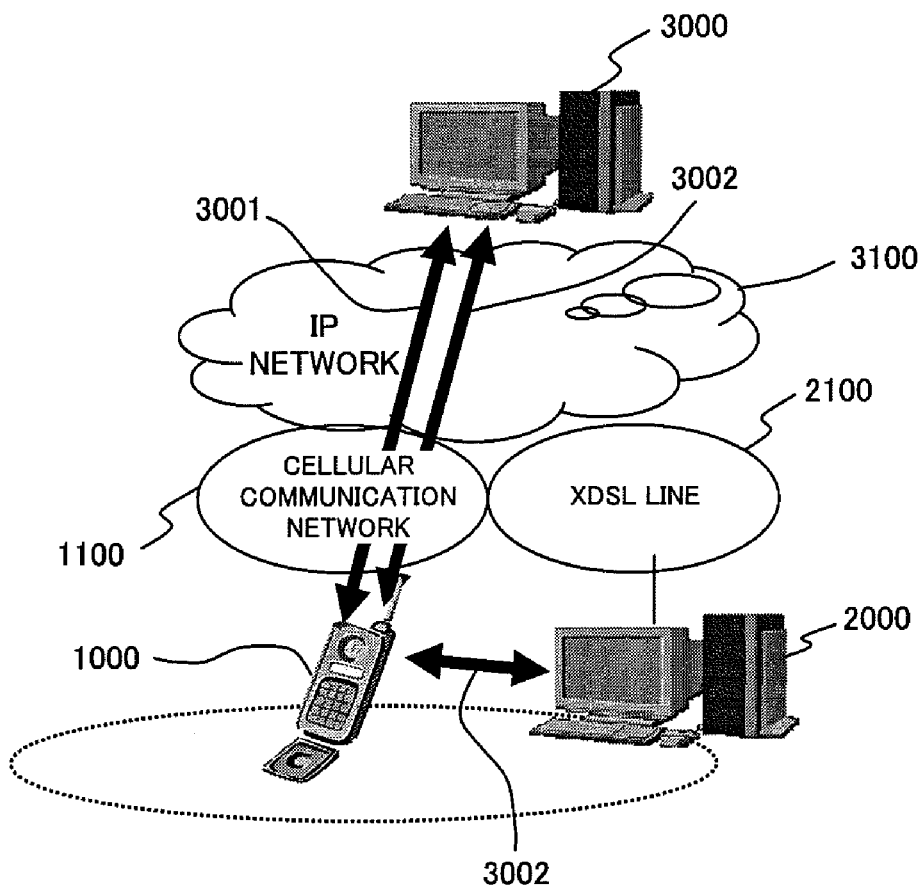
FIG. 2 is a schematic (No. 2) explaining a problem of a conventional technique.
Figure 3:
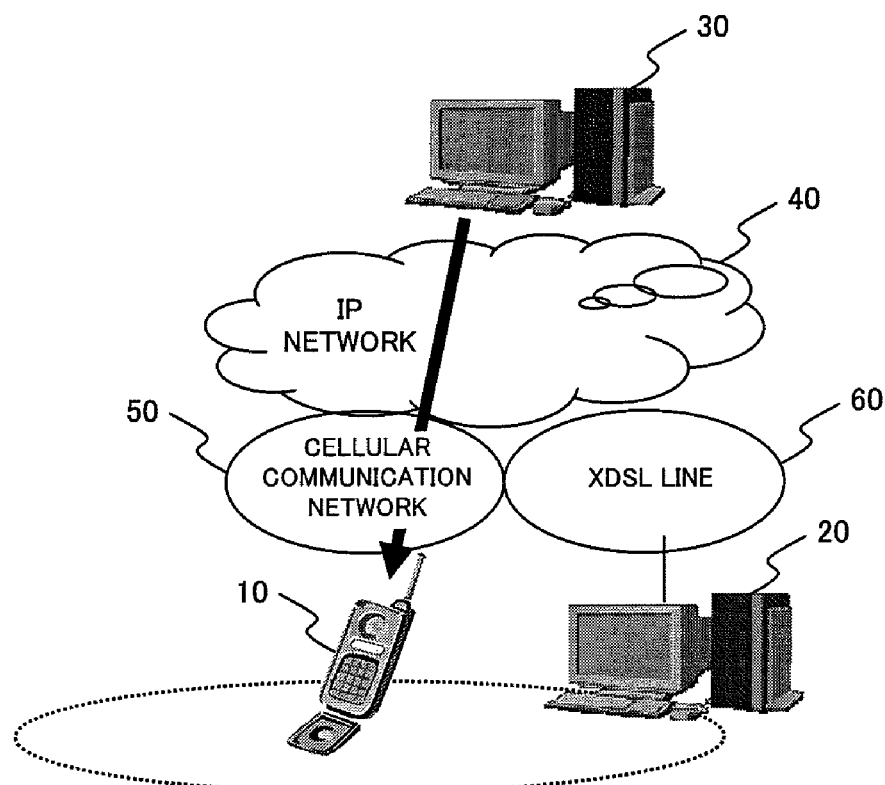
FIG. 3 is a schematic showing a configuration of a communication system for carrying out the present invention.

FIG. 3 is described first. This figure shows a configuration of a communication system for carrying out the present invention.

In the communication system shown in FIG. 3, a PC 20 that is a neighboring communication device exists in the neighborhood of a cellular phone (equipped with a videophone function) 10 that is a local communication device. A communication network is configured by connecting a cellular communication network 50 that the cellular phone 10 uses for a communication, and an xDSL line 60 that the PC 20 uses for a communication respectively to an IP network 40 that a communication corresponding terminal 30 uses for a communication. Assume that both the cellular phone 10 and the PC 20 have a wireless LAN function, and can directly exchange communication data by using the ad hoc mode of the wireless LAN function.

FIG. 4 is described next. This figure shows a configuration of the cellular phone 10.

In FIG. 4, all of a controlling unit 11, a cellular network communicating unit 12, a wireless LAN communicating unit 13, an inputting unit 14, and an outputting unit 15 are connected to a bus 16, and can mutually exchange various types of data under the control of the controlling unit 11.

The controlling unit 11 comprises a microprocessor (MPU) and a storing unit. The MPU executes a control program pre-stored in the storing unit, whereby operations of the entire cellular phone 10 are controlled.

The cellular network communicating unit 12 connects the cellular phone 10 to the cellular communication network 50, and manages exchanges of various types of data with the cellular communication network 50.

The wireless LAN communicating unit 13 manages exchanges of various types of data between the cellular phone 10 and a neighboring wireless LAN appliance.

The inputting unit 14 obtains an input from a user of the cellular phone 10, and comprises, for example, a microphone for obtaining voice, and a group of various types of operation switches for obtaining operation instructions.

The outputting unit 15 presents various items of information to the user of the cellular phone 10, and comprises, for example, a display unit for displaying an image and text information, and a speaker for outputting voice.

FIG. 5 is described next. This figure shows a configuration of the PC 20.

In FIG. 5, all of an MPU 21, a ROM 22, a RAM 23, an HDD 24, an inputting unit 25, an outputting unit 26, an xDSL communicating unit 27, and a wireless LAN communicating unit 28 are connected to a bus 29, and can mutually exchange various types of data under the MPU 21.

The MPU 21 controls the operations of the entire PC 20 by reading and executing a control program presorted in the HDD 24.

The ROM 22 is a memory in which a basic control program executed by the MPU 21 is pre-stored. The MPU 21 performs a basic control for the operations of the entire PC 20 by executing this basic control program at the startup of the PC 20.

The RAM 23 is used as a working memory when the MPU 21 executes various types of control programs. This is a memory that also functions as a main memory used as a temporary storage area of various types of data depending on need.

The HDD 24 is a hard disk device in which a control program for causing the MPU 21 to execute various types of control processes executed in the PC 20 is pre-stored.

The inputting unit 25 obtains an input from the user of the PC 20, and comprises a microphone for obtaining voice in addition to, for example, a mouse device/keyboard device for obtaining an operation instruction.

The outputting unit 26 presents various items of information to the user of the PC 20, and comprises, for example, a display unit for displaying an image and text information, and a speaker for outputting voice.

The xDSL communicating unit 27 is, for example, a modem. This unit connects the PC 20 to the xDSL line 60, and manages exchanges of various types of data with the xDSL line 60.

The wireless LAN communicating unit 28 manages exchanges of various types of data between the PC 20 and a neighboring wireless LAN appliance.

Operations of the communication system for carrying out the present invention are summarized. Initially, an environmental change in a local communication device is detected. Here, the environmental change in the local communication device indicates, for example, a change in a neighboring communication device, a change in the state of a network to which the local communication device is connected, or a change in the state of an application running in the local communication device.

The change in the neighboring communication device indicates the new entry of a neighboring communication device or the exit of the local communication device due to a user move, or ON/OFF of a power supply. Such changes can be detected by the local communication device itself, a sensor device, an access network terminating device such as a wireless LAN access point, etc., a location managing server for managing the location of a user, or the like.

The change in the state of the network indicates a connection/disconnection of a network in a local communication device, an increase/decrease in the intensity of radio waves in a wireless access, a change in the state of network congestion, a change in a throughput, a change in the state of reserving securing a QoS path, or the like. Such changes can be detected by a local communication device, an access network terminating device, a QoS server, or the like.

The change in the state of the application running in the local communication device indicates the activation/deactivation of an application such as a Web browser, etc., the start/end of a communication session of a videophone, etc. Such changes can be detected by a local communication device directly related to an application, an application server, a communication counterpart device, a relay device that can obtain the state of an application with packet monitoring, or the like.

The communication system for carrying out the present invention makes selections of a communication device and a communication path for each user, for each application, or for each flow type by taking the detection of such changes as a cue. Here, the flow means the flow of a series of relevant communication packets. By way of example, for a videophone application, a voice flow and an image flow exist.

With the selection of a communication device, an optimum device is selected from among optional communication devices in consideration of the processing performance, the input/output function, an installed application, the network connection function, the state of a network connection, and the like of each of the optional communication devices in response to an action (the start of execution of an application, an input to an application, or an output from an application) instructed by a user. For this selection, user's preference may be given when a communication device is selected. For example, preference is always given to a device comprising a maximum display as an output device.

With the selection of a communication path, either of "autonomous type" and "dependent type" communication paths is selected in consideration of the network connection function and the connection state of a selected communication device.

The autonomous type communication path means a path on which a communication packet transmitted from a source is terminated by a local communication device, not via a neighboring communication device.

An example of the autonomous type communication path in the communication system shown in FIG. 3 is depicted in FIG. 6. In this figure, a communication path on which a communication packet transmitted from the communication corresponding terminal 30 is transferred and addressed to the cellular phone 10, not via the PC 20, namely, a communication path, which is represented with an arrow in FIG. 6, from the communication counterpart terminal 30 to the cellular phone 10, which is a destination communication device, via the IP network 40 and the cellular communication network 50 is the autonomous type communication path.

In the meantime, the dependent type communication path means a path on which a communication packet is terminated by a local communication device and transmitted from a source, via a neighboring communication device.

An example of the dependent type communication path in the communication system shown in FIG. 3 is depicted in FIG. 7. In this figure, a communication path on which a communication packet transmitted from the communication corresponding terminal 30 and addressed to the cellular phone 10, via the PC 20, namely, a communication path, which is represented with an arrow in FIG. 7, from the communication corresponding terminal 30 to the cellular phone 10, which is the destination communication device, via the IP network 40, the xDSL line 60, and the PC 20, and further via the ad hoc mode of the wireless LAN function is the dependent type communication path.

With the selection of this communication path, an optimum path is selected based on various items of information such as the communication cost of each network connection, a communication rate, the degree of network congestion, the quality of radio waves, a QoS function, etc., and the characteristic of a transfer function of each communication device, and the like. For this selection, user's preference such as cost preference, speed preference, etc. may be given similar to the selection of a communication device.

In the communication system for carrying out the present invention, a communication packet is distributed to each communication device according to the results of selections of a communication device and a communication path, which are made as described above. This distribution is made by using various types of identifiers indicated in a communication packet: a layer 2 address such as a MAC (Media Access Control) address, etc., a layer 3 address such as an IP address, etc., a port number, a QoS field such as a ToS (Type of Service) field of an IP packet, etc., a layer 7 address such as a URL (Uniform Resource Locator), etc., a user identifier such as SIP (Session Initiation Protocol)-URI (Uniform Resource Identifier), etc.

If a communication path is made dependent, a neighboring communication device is made to implement this transfer function. Or, if the communication path is made autonomous, an access network terminating device, a relay device such as a router, a home agent in MobileIP (RFC3344), etc., an application server, or a communication corresponding counterpart device is made to provide this transfer function.

Operations of the communication system for carrying out the present invention are described in detail below.

Figure 8:
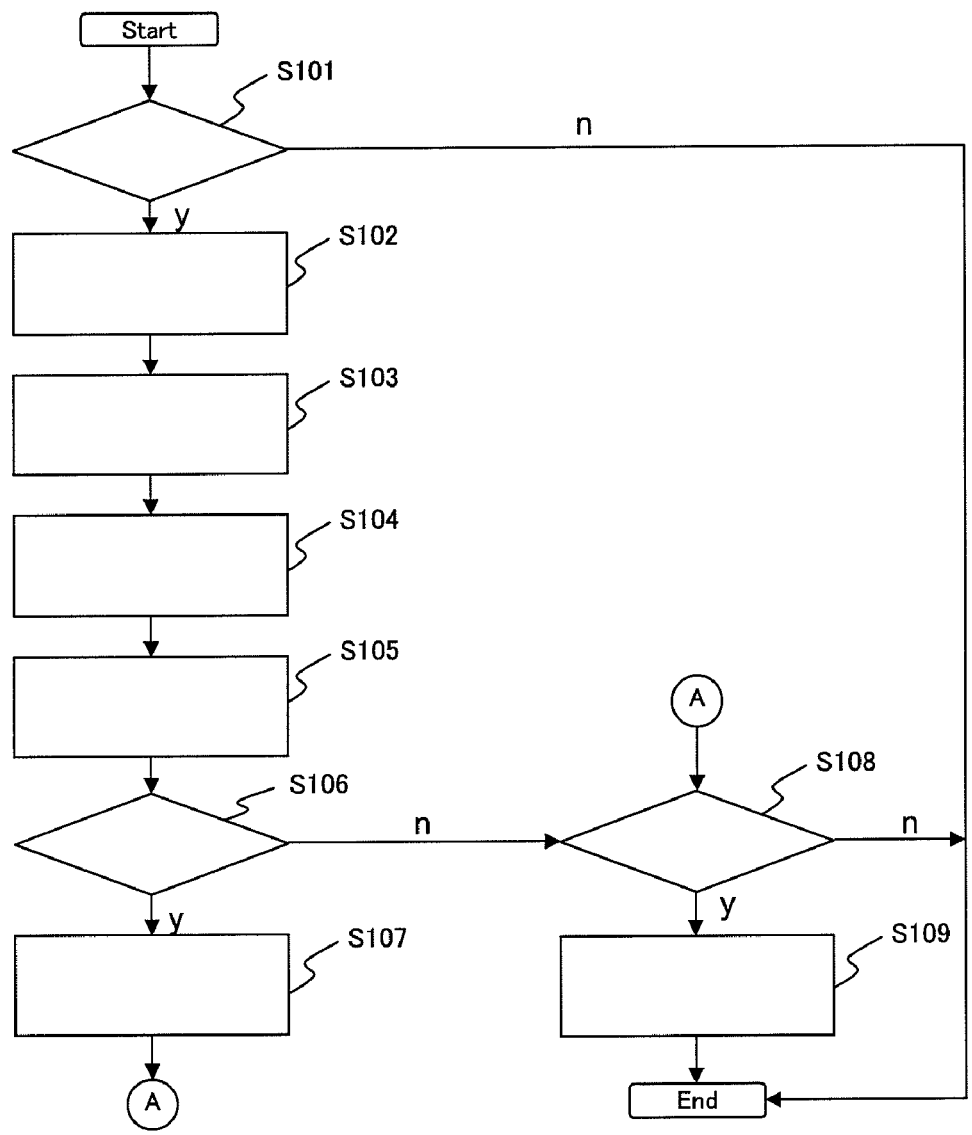
FIG. 8 is a flowchart showing the contents of a control process executed by the cellular phone of the communication system shown in FIG. 3.
Figure 9:
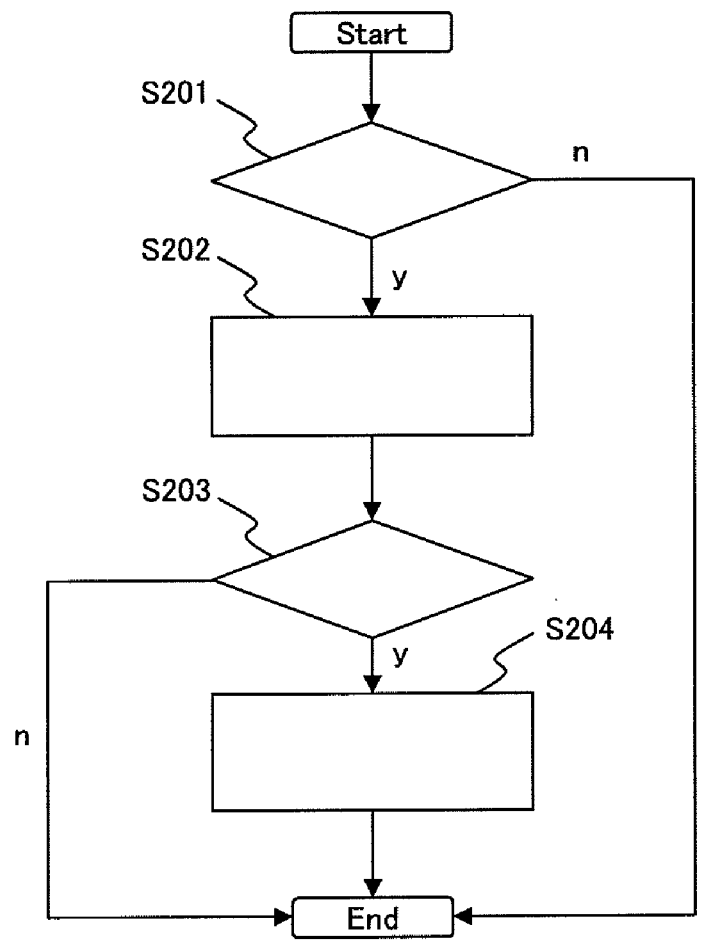
FIG. 9 is a flowchart showing the contents of a control process executed by the PC of the communication system shown in FIG. 3.

FIGS. 8 and 9 are described first. These figures are flowcharts showing the contents of control processes executed in the communication system shown in FIG. 3. FIG. 8 shows the control process executed in the controlling unit 11 of the cellular phone 10, whereas FIG. 9 shows the control process executed by the MPU 21 of the PC 20.

The process shown in FIG. 8 is described first. The MPU executes the control program pre-stored in the storing unit in the controlling unit 11 of the cellular phone 10, whereby this process is implemented. This process is repeatedly started at predetermined time intervals.

Initially, an environmental change detection process is executed in S101. This process is a process for determining whether or not an environmental change is detected in the cellular phone 10. Here, if the environmental change is determined to be detected (if the determination result is "YES"), the process goes to S102. Or, if the environmental change is determined not to be detected (if the determination result is "NO"), the control process shown in FIG. 8 is terminated. The controlling unit 11 of the cellular phone 10 functions as a detecting unit by executing the process of S101.

In S102, a neighboring communication device property obtainment process is executed. This process is a process for obtaining the communication device properties of a neighboring communication device (the PC 20 in the network configuration shown in FIG. 3).

In S103, a property matching process is executed. This process is a process for making matching between the communication device properties of the cellular phone 10 itself, the communication device properties of the neighboring communication device, which are obtained with the process of S102, and the properties of an application running in the cellular phone 10 itself. Then, a communication device selection process is executed in S104, and a communication path selection process is further executed in S105. These processes are processes for selecting optimum device and path in the running application from among communication devices and communication paths based on the results of matching made with the process of S103. The controlling unit 11 of the cellular phone 10 functions as a selecting unit by executing the processes of S102 to S105.

In S106, a neighboring communication device use determination process is executed. This process is a process for determining based on the above described selection results whether or not to use the neighboring communication device. Here, only if the neighboring communication device is determined to be used (only if the determination result is "YES"), a neighboring communication device setting notification transmission process, namely, a process for transmitting to the neighboring communication device a notification to request settings required to make a communication by using the neighboring communication device is executed in S107.

In S108, an other appliance use determination process is executed. This process is a process for determining whether or not a notification to request the settings of a data transfer is required for the communication corresponding terminal 30 or a relay device such as a router, etc. in order to use the communication device and the communication path, which are related to the above described selection results. Here, if the notification is determined to be required (if the determination result is "YES"), an other appliance transfer setting notification process, namely, a process for transmitting the notification to request the settings of a data transfer to the communication corresponding terminal 30 or the relay device, for which the notification is required, is executed in S109. Thereafter, the control process of FIG. 8 is terminated. If the notification is determined not to be required in S108, the control process of FIG. 8 is terminated without executing the process of S109.

The controlling unit 11 of the cellular phone 10 functions as a switching instructing unit by executing the processes of S106 to S109.

The process shown in FIG. 9 is described next. The MPU 21 executes the control program pre-stored in the RAM 23 or the HDD 24 of the PC 20, whereby this process is implemented. This process is repeatedly started at predetermined time intervals.

Initially, in S201, a neighboring communication device setting notification reception determination process is executed. This process is a process for determining whether the notification to request the settings required to make a communication by using the neighboring communication device is received from the local communication device (the cellular phone 10 in the network configuration shown in FIG. 3) or not. Here, if the notification is determined to be received (if the determination result is "YES"), the process goes to S202. Or, if the notification is determined not to be received (if the determination result is "No"), the control process of FIG. 9 is terminated.

In S202, a neighboring communication device setting process is executed. Namely, a process for setting a function to implement a data transmission using a communication device and a communication path, which are related to the results of selections made in the local communication device, in the PC 20 itself is executed.

In S203, an other appliance use determination process is executed. This process is a process for determining whether or not a notification to request the settings of a data transfer is required to be issued from the PC 20 to the communication corresponding terminal 30 or a relay device such as a router, etc. in order to use the communication device and the communication path, which are related to the above described selection results. Here, if the notification is determined to be required (if the determination result is "YES"), an other appliance transfer setting notification process, namely, a process for transmitting the notification to request the settings of a data transfer to the communication corresponding terminal 30 or the relay device, for which the notification is required, is executed in S204. Thereafter, the control process of FIG. 9 is terminated. If the notification is determined not to be required in S203, the control process of FIG. 9 is terminated without executing the process of S204.

The MPU 21 of the PC 20 functions as a switching unit by executing the control process of FIG. 9.

Figure 10A:
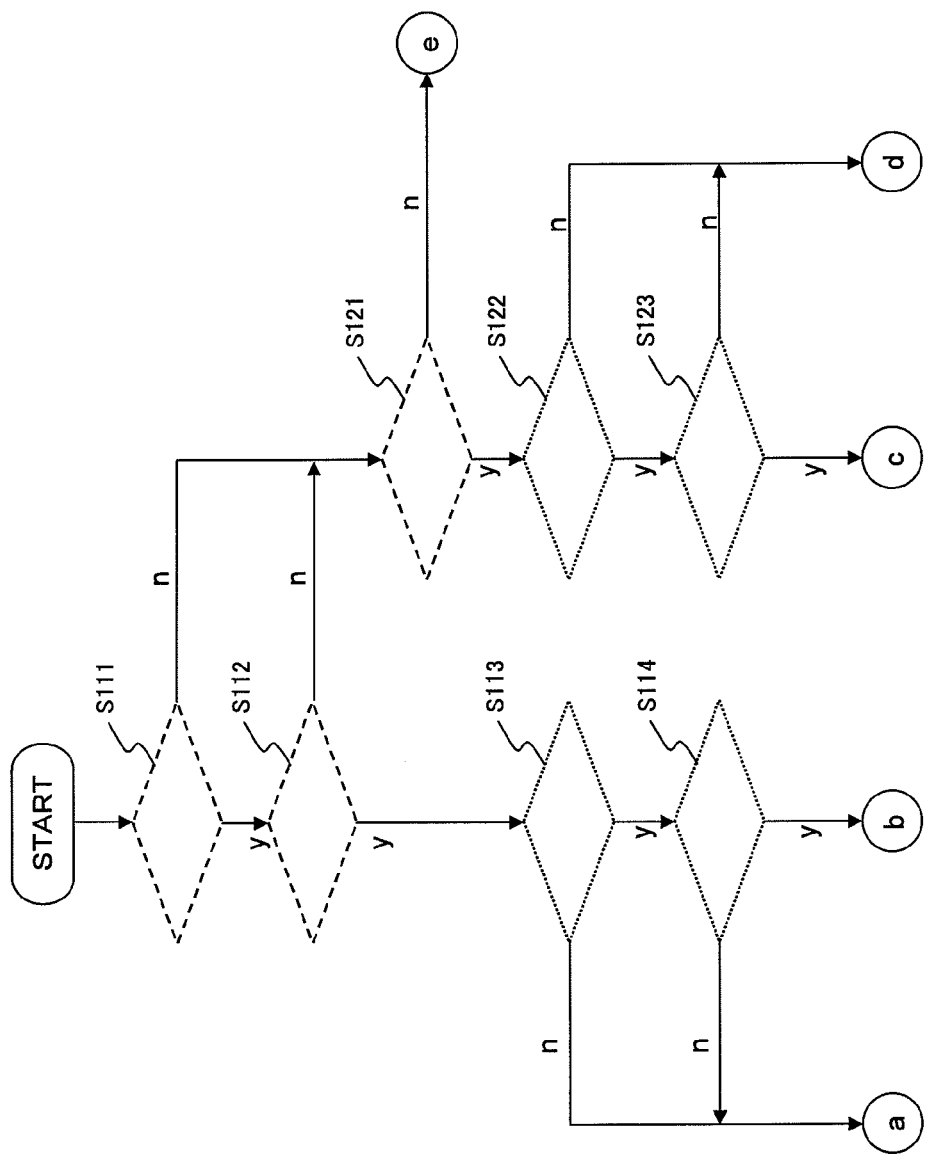
FIG. 10A is a flowchart (No. 1) exemplifying a process for making selections of a communication device and a communication path, which is executed by a local communication device.
Figure 10B:
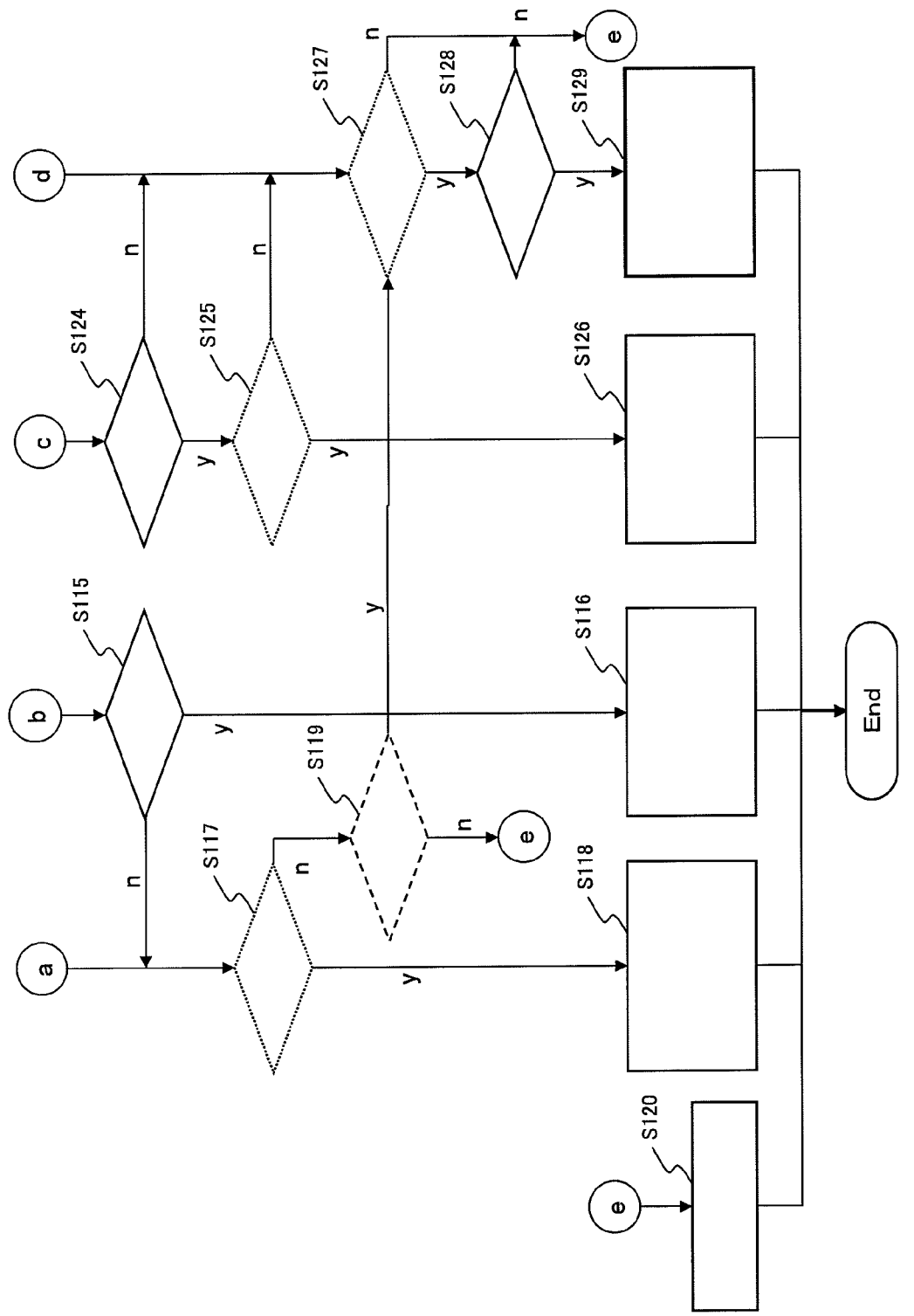
FIG. 10B is a flowchart (No. 2) exemplifying the process for making selections of a communication device and a communication path, which is executed by the local communication device.

FIGS. 10A and 10B are described next. These figures are flowcharts exemplifying a process for making selections of a communication device and a communication path, which is executed in the local communication device, and are equivalent to the processes executed in S103 to S105 in the control process shown in FIG. 8. This selection process is executed for each flow type (a voice flow, an image flow, etc.).

Initially, in S111 of FIG. 10A, a process for determining whether or not the neighboring communication device is able to reproduce the data of a flow type to be selected is executed. Here, if the neighboring communication device is determined to be able to play the data (if the determination result is "YES"), the process goes to S112. Or, if the neighboring communication device is determined not to be able to play the data (if the determination result is "NO"), the process goes to S121.

In S112, a process for determining whether the device properties (such as the performance of a processor, an input/output function, an installed application, etc.) of the neighboring communication device satisfy or not conditions required to play the data of the flow type to be selected is executed. Here, if the device properties are determined to satisfy the conditions (if the determination result is "YES"), the process goes to S113. Or, if the device properties are determined not to satisfy the conditions (if the determination result is "NO"), the process goes to S121.

In S113, a process for determining whether or not the neighboring communication device is being favorably connected to its available network is executed. Here, if the device is determined to be being favorably connected (if the determination result is "YES"), the process goes to S114. Or, if the device is determined not to be being favorably connected (if the determination result is "NO"), the process goes to S117 (FIG. 10B).

In S114, a process for determining whether or not the communication cost (communication expense) of the network available to the local communication device is more expensive and inferior to that of the network available to the neighboring communication device is executed. Here, if the communication cost is determined to be more expensive (if the determination result is "YES"), the process goes to S115 (FIG. 10B). Or, if the communication cost is determined not to be more expensive (if the determination result is "NO"), the process goes to S117 (FIG. 10B).

The process goes to FIG. 10B. In S115, a process for determining whether or not a communication rate when the network of the neighboring communication device is used is able to get a communication band required for an application to run is executed. Here, if the communication rate is determined to be able to get the communication band (if the determination result is "YES"), the process goes to S116. Or, if the communication rate is determined not to be able to secure the communication band (if the determination result is "NO"), the process goes to S117.

In S116, a process for selecting the neighboring communication device as a communication device, and for selecting the network available to the neighboring communication device as a communication path is executed. Thereafter, this selection process is terminated.

In S117, a process for determining whether or not both the local communication device and the neighboring communication device have a data transfer function is executed. Here, if both the devices are determined to have the data transfer function (if the determination result is "YES"), the process goes to S118. Or, if both the devices are determined not to have the data transfer function (if the determination result is "NO"), the process goes to S119.

In S118, a process for selecting the neighboring communication device as a communication device, and for selecting the network available to the local communication device as a communication path is executed. Thereafter, this selection process is terminated.

In S119, a process for determining whether or not the device properties (the performance of a processor, an input/output function, an installed application, etc.) of the local communication device satisfy conditions required to play the data of the flow type to be selected is executed. Here, if the device properties are determined to satisfy the conditions (if the determination result is "YES"), the process goes to S127. Or, if the device properties are determined not to satisfy the conditions (if the determination result is "NO"), the process goes to S120.

In S120, a process for regarding the play of the data of the flow type to be selected as being impossible, and for stopping the play of the data is executed. Thereafter, this selection process is terminated.

Referring back to FIG. 10A. In S121, a process for determining whether or not the device properties of the local communication device satisfy the conditions required to play the data of the flow type to be selected is executed. Here, if the device properties are determined to satisfy the conditions (if the determination result is "YES"), the process goes to S122.

Or, if the device properties are determined not to satisfy the conditions (if the determination result is "NO"), the process goes to S120 (FIG. 10B).

In S122, a process for determining whether or not the neighboring communication device is being favorably connected to its available network is executed. Here, if the device is determined to be being favorably connected (if the determination result is "YES"), the process goes to S123. Or, if the device is determined not to be being favorably connected (if the determination result is "NO"), the process goes to S127 (FIG. 10B).

In S123, a process for determining whether or not the communication cost (communication expenses) of the network available to the local communication device is more expensive and inferior to that of the network available to the neighboring communication device is executed. Here, if the communication cost is determined to be more expensive (if the determination result is "YES"), the process goes to S124 (FIG. 10B). Or, if the communication cost is determined not to be more expensive (if the determination result is "NO"), the process goes to S127 (FIG. 10B).

The process goes to FIG. 10B. In S124, a process for determining whether or not a communication rate when the network of the neighboring communication device is used is able to get a communication band required for an application made to run is executed. Here, if the communication rate is determined to be able to get the communication band (if the determination result is "YES"), the process goes to S125. Or, if the communication rate is determined not to be able to get the communication band (if the determination result is "NO"), the process goes to S127.

In S125, a process for determining whether or not both the local communication device and the neighboring communication device have a data transfer function is executed. Here, if both the devices are determined to have the data transfer function (if the determination result is "YES"), the process goes to S126. Or, if both the devices are determined not to have the data transfer function (if the determination result is "NO"), the process goes to S127.

In S126, a process for selecting the local communication device as a communication device, and for selecting the network available to the neighboring communication device as a communication path is executed. Thereafter, this selection process is terminated.

In S127, a process for determining whether or not the local communication device is being favorably connected to its available network is executed. Here, if the local communication device is determined to be being favorably connected (if the determination result is "YES"), the process goes to S128. Or, if the local communication device is determined not to be being favorably connected (if the determination result is "NO"), the process goes to S120.

In S128, a process for determining whether or not a communication rate when the network of the local communication device is used is able to get a communication band required for an application made to run is executed. Here, if the communication rate is determined to be able to get the communication band (if the determination result is "YES"), the process goes to S129. Or, if the communication rate is determined not to be able to get the communication band (if the determination result is "NO"), the process goes to S120.

In S129, a process for selecting the local communication device as a communication device, and for selecting the network available to the local communication device as a communication path is executed. Thereafter, this selection process is terminated.

A communication device and a communication path are selected as described above. S111, S112, S119 and S121 in the above described control process are the determination processes executed based on the properties of an application, whereas S113, S114, S117, S122, S123, S125 and S127 are the determination processes executed based on the properties of a communication device. Additionally, S115, S124 and S128 are the determination processes executed based on the results of matching between the properties of an application and those of a communication device.

Implementation examples where a communication device and a communication path are selected in different selection units, by way of example, for each user, for each application, and for each flow type are cited below as implementation examples of the communication system for carrying out the present invention. These implementation examples are listed in the following [table 1].

| IMPLEMEN-TATION EXAMPLE | SELECTION UNIT | COMMUNICATION PATH | APPLICATION | ENVIRONMENTAL CHANGE | DETECTING DEVICE | DETERMINING DEVICE | TRANSFERING DEVICE | PACKET IDENTIFIER |
|---|---|---|---|---|---|---|---|---|
| 1 | USER | DEPENDENT TYPE | VoIP STREAMING | POWER ON | COMMUNICATION DEVICE | COMMUNICATION DEVICE | COMMUNICATION DEVICE | IP ADDRESS/ PORT NUMBER |
| 2 | APPLICATION | AUTONOMOUS TYPE | VoIP STREAMING | DETECTION OF COMMUNICATION DEVICE | COMMUNICATION DEVICE | COMMUNICATION DEVICE | SERVER | IP ADDRESS |
| 3 | APPLICATION | COEXISTENT TYPE (AUTONOMOUS + DEPENDENT) | VoIP STREAMING | APPLICATION ACTIVATION/ SESSION START | COMMUNICATION DEVICE | COMMUNICATION DEVICE | COMMUNICATION DEVICE | IP ADDRESS/ PORT NUMBER |
| 4 | FLOW | AUTONOMOUS TYPE | VIDEO-PHONE | CHANGE IN NETWORK STATE | COMMUNICATION DEVICE | COMMUNICATION DEVICE | RELAY DEVICE | IP ADDRESS/ PORT NUMBER | communication paths, which are totaled by adding a coexistent type (an autonomous type+a dependent type) to the above described autonomous and dependent types, among optional communication paths is selected. Additionally, a type of an environmental change and a device for providing a transfer function are mutually different.

Assume that communication devices and network communicating means, which are shown in the following [table 2], are respectively used, and IP addresses shown in [table 2] are assigned to the network communicating means in the following implementation examples.

TABLE 2

| COMMUNICATION DEVICE | GLOBAL IP COMMUNICATION | | NEAR FIELD COMMUNICATION | |
|---|---|---|---|---|
| | COMMUNICATION MEANS | IP ADDRESS | COMMUNICATION MEANS | IP ADDRESS |
| CELLULAR PHONE | CELLULAR COMMUNICATION NETWORK | 30.0.0.1 | WIRELESS LAN AD HOC | 10.0.0.1 |
| PC | ADSL LINE | 20.0.0.1 | WIRELESS LAN AD HOC | 10.0.0.2 |

The following implementation examples assume that the cellular phone 10 that is the local communication device has communication device properties and network properties (the properties of the cellular communication network 50 available to the cellular phone 10), which are shown in [table 3], and the PC 20 that is the neighboring communication device has communication device properties and network properties (the properties of the xDSL line 60 available to the PC 20), which are shown in [table 4], unless otherwise noted.

TABLE 3

| DEVICE NAME | | CELLULAR PHONE |
|---|---|---|
| DEVICE PROPERTIES | PERFORMANCE | PROCESSOR = 624 kHz |
| | INPUT/OUTPUT FUNCTION | 2.5-INCH DISPLAY, SPEAKER, MICROPHONE |
| | INSTALLED APPLICATION | STREAMING, VoIP, VIDEOPHONE |
| NETWORK PROPERTIES | CONNECTION STATE | BEING CONNECTED |
| | COMMUNICATION COST | PAY-PER-USE |
| | COMMUNICATION RATE | 1 Mbps |
| | STATE OF RADIO WAVES | FAVORABLE |
| | TRANSFER FUNCTION | PRESENT |

TABLE 4

| DEVICE NAME | | PC |
|---|---|---|
| DEVICE PROPERTIES | PERFORMANCE | PROCESSOR = 2.4 GHz |
| | INPUT/OUTPUT FUNCTION | 17-INCH DISPLAY, SPEAKER |
| | INSTALLED APPLICATION | STREAMING/ VIDEOPHONE |
| NETWORK PROPERTIES | CONNECTION STATE | BEING CONNECTED |
| | COMMUNICATION COST | NONE |
| | COMMUNICATION RATE | 10 Mbps |
| | STATE OF RADIO WAVES | — |
| | TRANSFER FUNCTION | PRESENT |

Also assume that applications available to the cellular phone 10 that is the local communication device respectively have properties shown in [table 5].

TABLE 5

| APPLICATION NAME | STREAMING | VIDEOPHONE | VoIP |
|---|---|---|---|
| WHETHER OR NOT FLOW CAN BE REPRODUCED IN NEIGHBORING | VOICE FLOW: ○ IMAGE FLOW: ○ | VOICE FLOW: X IMAGE FLOW: ○ | VOICE FLOW: X |
| REQUIRED BAND | VOICE FLOW: 64 kbps IMAGE FLOW: 500 kbps | VOICE FLOW: 64 kbps IMAGE FLOW: 256 kbps | VOICE FLOW: 64 kbps |

The implementation examples are described based on the above assumptions.

Implementation Example 1

A scenario assumed in this implementation example is that a user uses VoIP (Voice over Internet Protocol) and streaming with the cellular phone 10 which is a mobile terminal. Since a communication device and a communication path are selected in units of users in this implementation example, a communication device and a communication path, which are common to both the applications used by the user, are selected.

Figure 11:
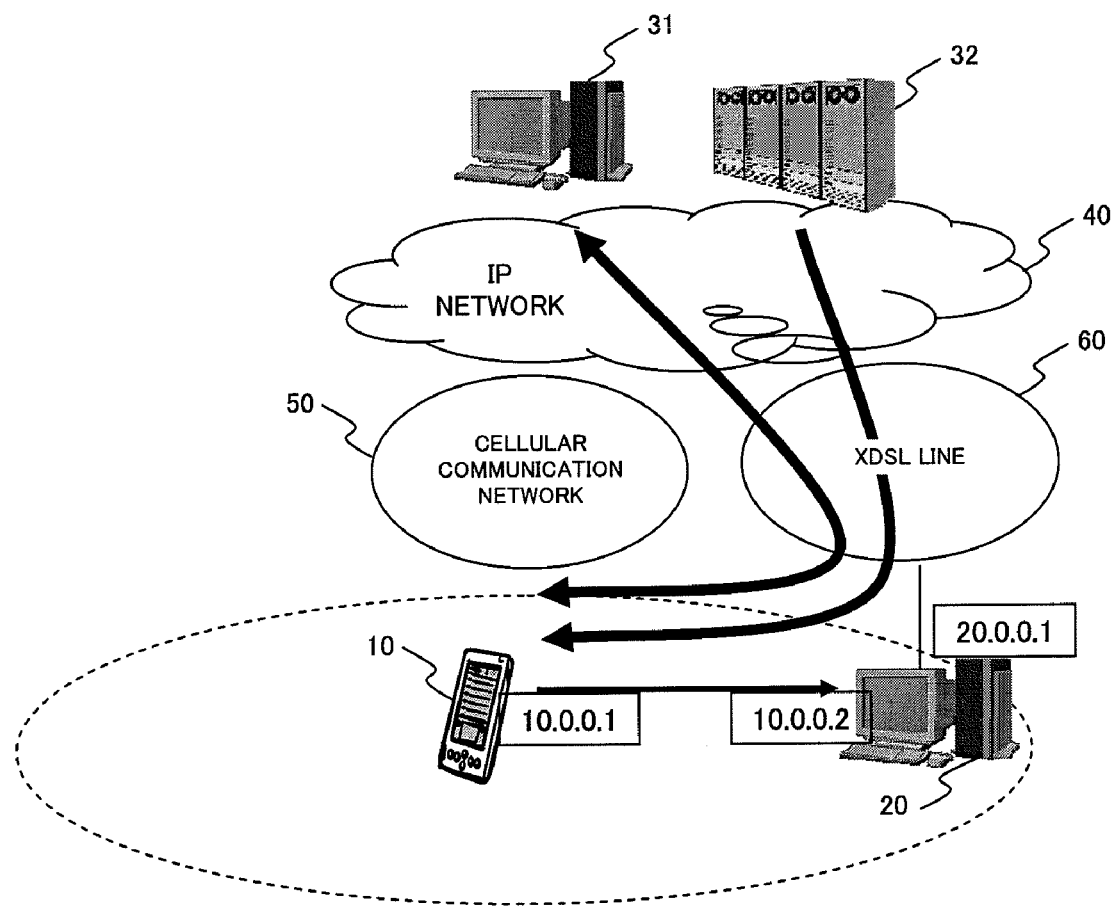
FIG. 11 is a schematic showing result of the selections of a communication device and a communication path, which are made according to an implementation example 1.

Results of selections of a communication device and a communication path, which are made in this implementation example in the communication system shown in FIG. 3, are depicted in FIG. 11. In this figure, a VoIP communication corresponding terminal 31 and a live streaming server 32 are represented as the communication corresponding terminal 30 shown in FIG. 3.

On the communication path shown in FIG. 11, the cellular phone 10 that is a destination communication device receives a communication packet addressed to the cellular phone 10 itself via the PC 20. Therefore, this communication path is a "dependent type". In this implementation example, the PC 20 implements, as a transfer function, an NAPT (Network Address Port Translation) function for transferring a communication packet based on an IP address and a port number, which are indicated in the communication packet. Additionally, the power-on of the cellular phone 10 is assumed to be an environment change in the cellular phone 10 in this implementation example.

Process sequences in the cellular phone 10 and the PC 20 in this implementation example are described below.

When a user initially turns on the cellular phone 10, the cellular phone 10 detects its environmental change (S101 of FIG. 8). Then, the cellular phone 10 obtains information about the properties of the PC 20 by using the ad hoc mode of the wireless LAN function (S102).

Here, the cellular phone 10 makes matching between the communication device properties ([table 4]) of the PC 20, the communication device properties ([table 3]) of the cellular phone 10, and the properties ([table 5]) of the VoIP and streaming applications (S103). Here, since the VoIP application is not installed in the PC 20 (see [table 4]), the cellular phone 10 is selected as a communication device. In the meantime, for connecting means (global network connecting means) for connecting the cellular phone 10 to the IP network 40, the xDSL line 60 (ADSL line), which is more advantageous than the cellular communication network 50, is selected as a communication path in terms of communication cost and rate for getting a band required for an image flow in the streaming application. Accordingly, it is selected that a user makes all of data communications with the VoIP communication corresponding terminal 31 and the live streaming server 32 by using the cellular phone 10 via the xDSL line 60 (ADSL line) available to the PC 20 (S104 and S105). Namely, the "dependent type" communication path is selected in this case.

In this implementation example, the determination processes are executed in the order of S111, S112, S121, S122, S123, S124 and S125 also in all of the flows (the voice and the image flows in the streaming, and the voice flow in VoIP) in the selection process shown in FIGS. 10A and 10B, and the selection results in S126 are obtained.

To make a data communication via the xDSL line 60 at this time, the cellular phone 10 sets the PC 20 as a gateway when transmitting an IP packet. Specifically, a default gateway in a path table comprised by the cellular phone 10 itself is set to the IP address (10.0.0.2) of the PC 20 in the wireless LAN function shown in [table 2].

Here, the above described selection results are notified to the PC 20 (S106 and S107). The PC 20 that receives this notification starts the operations of the NAPT function (S201 and S202 of FIG. 9).

Thereafter, when the user starts streaming and VoIP communications by operating the cellular phone 10, an upstream communication packet from the cellular phone 10 is transmitted to the PC 20. The PC 20 transfers the upstream communication packet, the source IP address and the source port number of which are translated by the NAPT function into the IP address (20.0.0.1) and a unique port number (such as 2000 for VoIP or 2500 for streaming) of the PC 20, to the VoIP communication corresponding terminal 31 or the live streaming server 32. This translation information is stored in the NAPT translation table comprised by the PC 20.

Thereafter, a downstream communication packet, the destination of which is set to the IP address (20.0.0.01) of the PC 20, is transmitted from the VoIP communication corresponding counterpart terminal 31 or the live streaming server 32. In the downstream communication packet, its destination port number is set to the above described unique port number (2000 for VoIP or 2500 for streaming). The NAPT function of the PC 20 references the above described NAPT translation table, inversely translates the destination IP address and the destination port number into the IP address (10.0.0.1) and the port number of the cellular phone 10, and transfers the packet to the cellular phone 10. In this way, a communication device at a transfer destination is determined by using packet identifiers such as an IP address and a port number in this implementation example.

Figure 12:
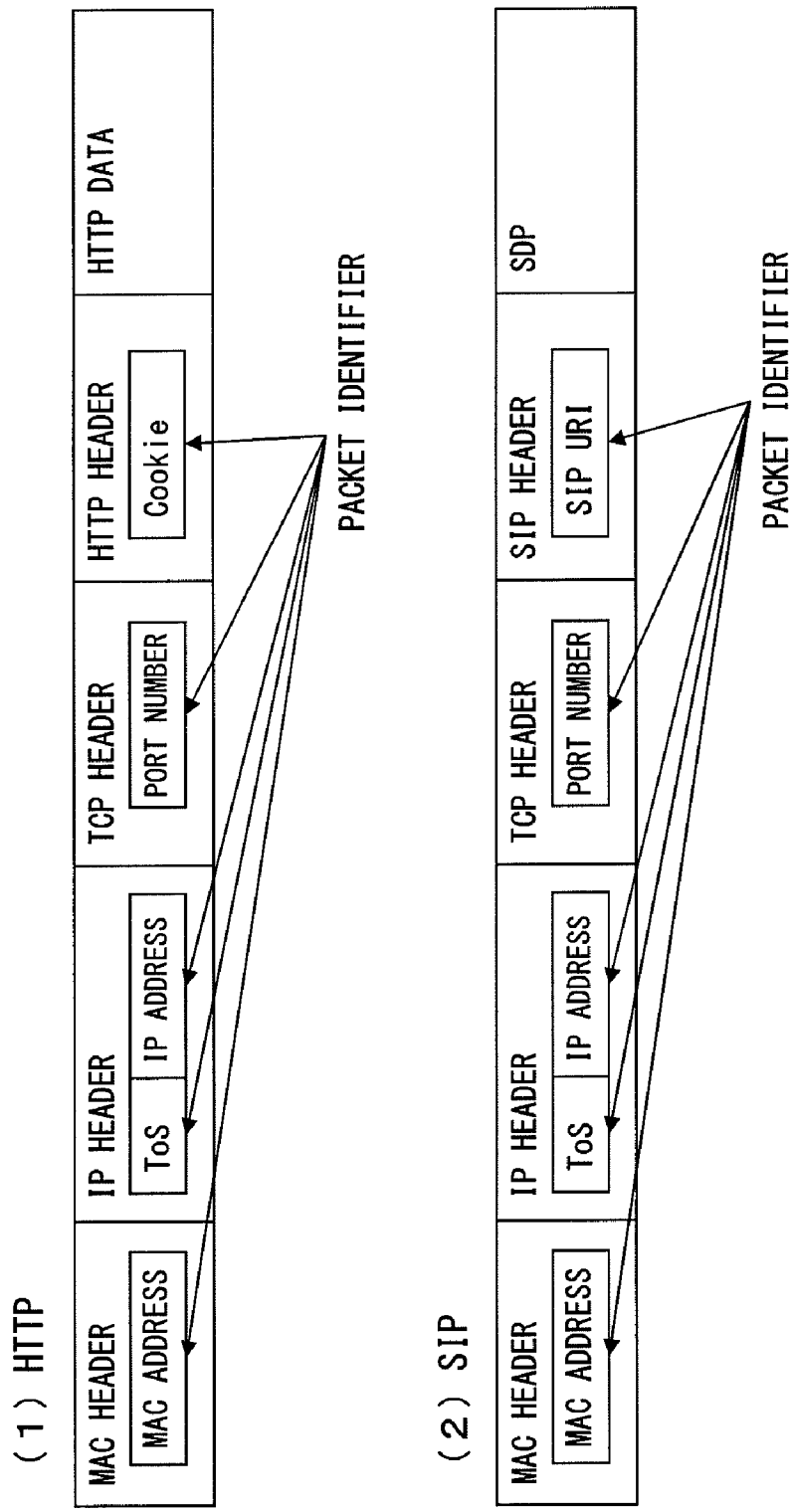
FIG. 12 is a schematic showing examples of identifiers of a communication packet.

In this implementation example, the NAPT function of an IP processing unit that the OS (Operating System) of the PC 20 normally comprises is used as the transfer function of the neighboring communication device. Alternatively to the NAPT function, for example, a transfer process in an application layer of a proxy server, etc. may be used as the transfer function. Additionally, examples of an identifier of a communication packet used to identify a communication device at a transfer destination when the communication packet is transferred include a MAC address within a MAC header, which is an address of a layer 2, a ToS field that is a QoS field or an IP address that is an address of a layer 3 within an IP header, a port number within a TCP header, and the like as shown in FIG. 12. Also a session ID of cookie information, etc. within an HTTP (Hyper Text Transfer Protocol) header in an HTTP packet, and SIP URI within an SIP header in an SIP packet are available as identifiers.

A communication device and a communication path are selected as described above in the implementation example 1 as shown in FIG. 11.

Implementation Example 2

Also a scenario assumed in this implementation example is that a user uses VoIP and streaming with the cellular phone 10 in a similar manner as in the above described implementation example 1. However, a communication device and a communication path are selected in units of applications in this implementation example. Accordingly, a communication device and a communication path, which vary by application, use a network. Additionally, this implementation example assumes that the PC 20 does not comprise the transfer function of a communication packet, unlike the contents of [table 4].

New detection of a neighboring communication device (PC 20) within the available range of the wireless LAN function is assumed to be the detection of an environmental change in the cellular phone 10 in this implementation example.

Figure 13:
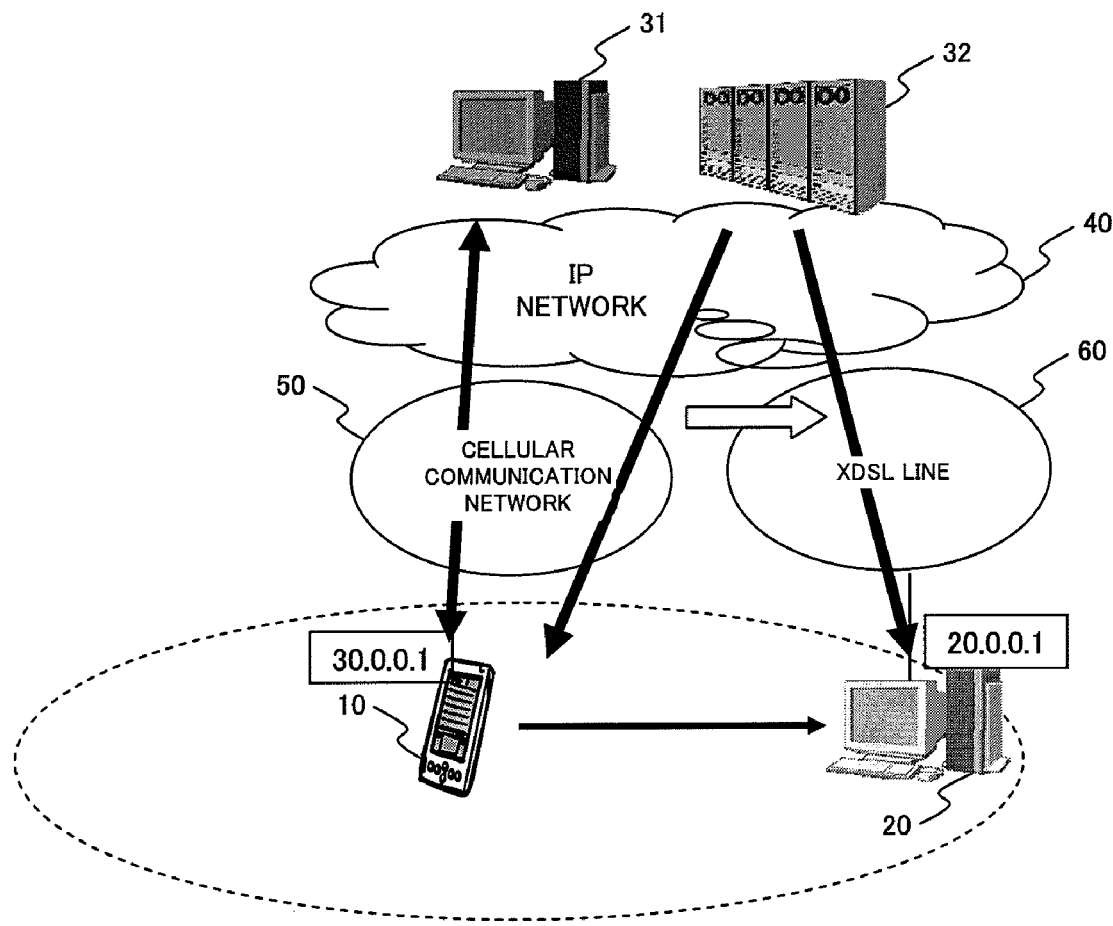
FIG. 13 is a schematic showing result of the selections of a communication device and a communication path, which are made according to an implementation example 2.

Results of selections of a communication device and a communication path, which are made in this implementation example in the communication system shown in FIG. 3, are depicted in FIG. 13. Process sequences in the cellular phone 10 and the PC 20 in this implementation example are described below.

Initially, assume that the VoIP and streaming applications are running in the cellular phone 10 that is the destination communication device, and the cellular communication network 50 is used as a communication path. The IP address of the cellular phone 10 in the cellular communication network 50 at this time is (30.0.0.1).

Here, the cellular phone 10 detects the PC 20 as a neighboring communication device (S101 of FIG. 8). Then, the cellular phone 10 that detects this environmental change obtains information about the properties of the PC 20 by using the ad hoc mode of the wireless LAN function (S102).

Here, the cellular phone 10 makes matching between the communication device properties ([table 4]) of the PC 20, the communication device properties ([table 3]) of the cellular phone 10, and the properties ([table 5]) of the VoIP and streaming applications (S103), and selects a communication device and a communication path, which are optimum for each of the applications (S104 and S105).

For the streaming application, the PC 20 and the xDSL line 60 are selected respectively as a communication device and a communication path due to reasons such that the streaming application is installed not only in the cellular phone 10 but also in the PC 20 (see [table 4]), and that the xDSL line 60 (ADSL line) is more advantageous than the cellular communication network 50 in terms of communication cost and rate for getting a band required for the image flow in the streaming application. Namely, since the PC 20 makes a data communication with the live streaming server 32 via the xDSL line 60 in this case, the "autonomous type" is selected as the communication path.

In the meantime, for the VoIP application, the cellular phone 10 is selected as a communication device because the VoIP application is not installed in the PC 20 (see [table 4]). Additionally, since the PC does not have the transfer function in this implementation example as described above, the cellular communication network 50 is forced to be selected as a communication path. Namely, the cellular phone 10 still makes a data communication with the VoIP communication corresponding terminal 31 via the cellular communicate network 50 in this case. Therefore, the "autonomous type" is selected as the communication path.

In the case of this implementation example, the determination processes are executed in the order of S111, S112, S113, S114 and S115 in the voice and the image flows in the streaming in the selection process shown in FIGS. 10A and 10B, and the selection results in S116 are obtained. In contrast, the determination processes are executed in the order of S111, S112, S121, S122, S123, S127 and S128 in the voice flow in VoIP, and the selection results in S129 are obtained.

The cellular phone 10 requests the PC 20 to start the reception of streaming based on the selection results, and notifies the PC 20 of information (such as the URL of the live streaming server 32, and the like) required for the reception (S106 and S107).

In the meantime, the PC 20 that receives the request and the notification activates the streaming application, and requests the live streaming server 32 to start streaming (S201 and S202 of FIG. 9). Upon receipt of this request, the live streaming server 32 starts streaming to the PC 20 (20.0.0.1). Namely, the live streaming server 32 distributes a communication packet to a communication device at a destination by using an IP address in this implementation example.

In the implementation example 2, a communication device and a communication path for streaming are switched as described above as shown in FIG. 13.

Implementation Example 3

The implementation example 3 is implemented by combining the implementation examples 1 and 2. Namely, a communication device and a communication path are selected in units of applications, and a "dependent type" and an "autonomous type" are selected respectively as VoIP and streaming communication paths at this time. Such selections of a communication device and a communication path, which differ by streaming, are referred to as a "coexistent type" selection.

This implementation example assumes the activation of an application and the start of a communication session to be environmental changes in the cellular phone 10.

Figure 14:
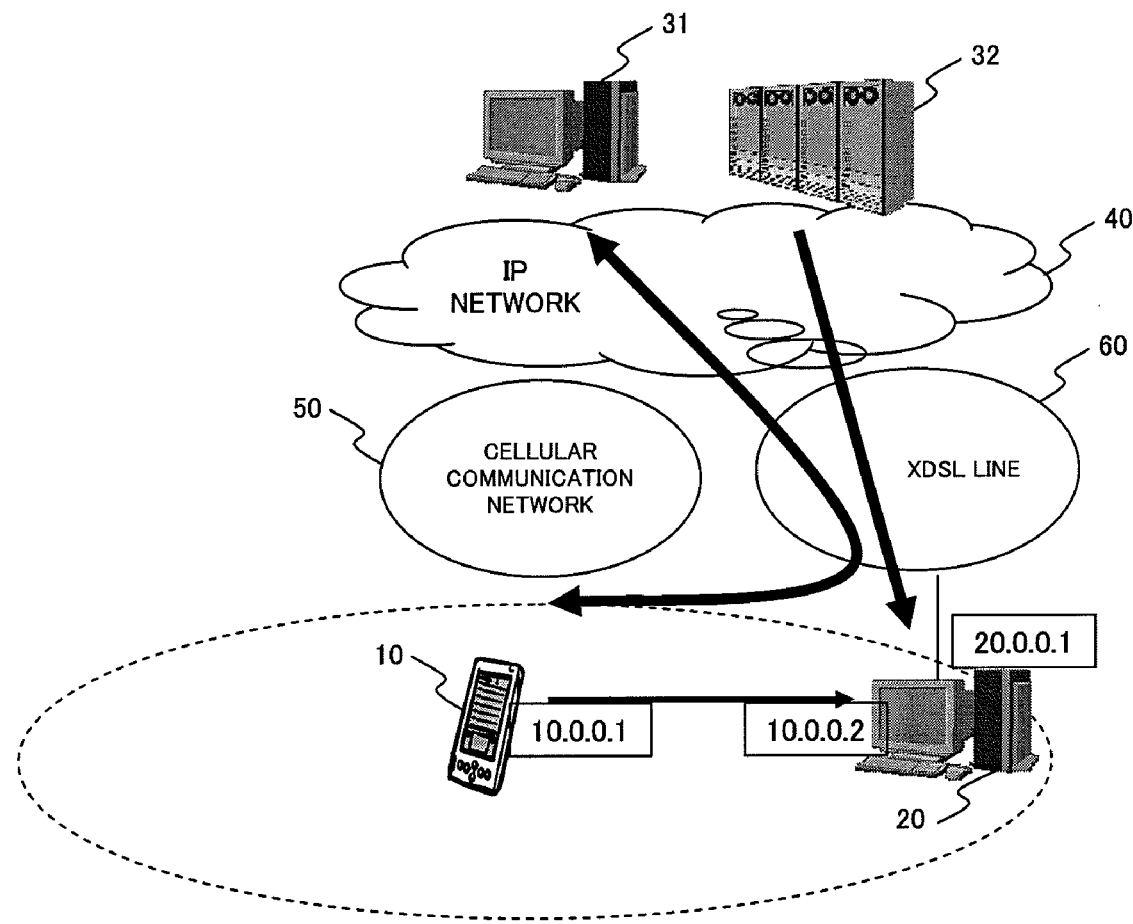
FIG. 14 is a schematic showing result of the selections of a communication device and a communication path, which are made according to an implementation example 3.

Results of selections of a communication device and a communication path, which are made in this implementation example in the communication system shown in FIG. 3, are depicted in FIG. 14. Process sequences in the cellular phone 10 and the PC 20 in this implementation example are described below.

Initially, a user activates the streaming application of the cellular phone 10. Then, the cellular phone 10 detects this environmental change (S101 of FIG. 8), and obtains information about the properties of the PC 20 by using the ad hoc mode of the wireless LAN function (S102). Next, the cellular phone 10 that is the destination communication device makes matching between the communication device properties of the PC 20 and the cellular phone 10 and the properties of the streaming application (S103), and selects a communication device and a communication path, which are optimum for the streaming (S104 and S105).

Here, selections similar to those in the implementation example 2 are made. Namely, the PC 20 and the xDSL line 60 are selected respectively as a communication device and a communication path due to reasons such that the streaming application is installed not only in the cellular phone 10 but also in the PC 20 (see [table 4]), and that the xDSL line 60 (ADSL line) is more advantageous than the cellular communication network 50 in terms of communication cost and rate for getting a band required for the image flow in the streaming application. Namely, the "autonomous type" is selected as the communication path in this case.

In the selection process shown in FIGS. 10A and 10B, the determination processes are executed in the order of S111, S112, S113, S114 and S115 in the voice and the image flows in the streaming, and the selection results in S116 are obtained.

The cellular phone 10 requests the PC 20 to start the reception of streaming based on the selection results, and notifies the PC 20 of information (such as the URL of the live streaming server 32, and the like) required for the reception (S106 and S107). Then, the PC 20 activates the streaming application, and requests the live streaming server 32 to start streaming (S201 and S202 of FIG. 9). Upon receipt of this request, the live streaming server 32 starts streaming to the PC 20 (20.0.0.1).

Thereafter, the user starts a VoIP session by operating the cellular phone 10. Then, the cellular phone 10 detects this environmental change (S101 of FIG. 8), and obtains information about the properties of the PC 20 by using the ad hoc mode of the wireless LAN function. Next, the cellular phone 10 makes matching between the communication device properties of the PC 20 and the cellular phone 10 and the properties of the streaming application (S103), and selects a communication device and a communication path, which are optimum for the streaming (S104 and S105).

For the VoIP, the cellular phone 10 is selected as a communication device because the VoIP application is not installed in the PC 20 (see [table 4]). However, since the PC 20 has the transfer function in this implementation example unlike the implementation example 2, the xDSL line 60 is selected as a communication path due to a reason such that the xDSL line 60 (ADSL line) is more advantageous than the cellular communication network 50 in terms of communication cost and rate for getting a band required for the voice flow in the VoIP application. Namely, the "dependent type" is selected as the communication path since the cellular phone 10 receives a communication packet addressed to the terminal 10 itself via the PC 20 in this case.

In the selection process shown in FIGS. 10A and 10B, the determination processes are executed in the order of S111, S112, S121, S122, S123, S124 and S125 in the voice flow in the VoIP, and the selection results in S126 are obtained.

To make a data communication via the xDSL line 60, the cellular phone 10 sets the PC 20 as a gateway when transmitting an IP packet in a similar manner as in the implementation example 1. Specifically, a default gateway in a path table comprised by the cellular phone 10 itself is set to the IP address (10.0.0.2) of the PC 20 in the wireless LAN function shown in [table 2].

Thereafter, when the user starts a VoIP communication by operating the cellular phone 10, an upstream communication packet from the cellular phone 10 is transmitted to the PC 20. The PC 20 transfers the upstream communication packet, the source IP address and the source port number of which are translated by the NAPT function into the IP address (20.0.0.1) and a unique port number (such as 2000) of the PC 20, to the VoIP communication corresponding terminal 31. This translation information is stored in the NAPT translation table comprised by the PC 20.

Thereafter, a downstream communication packet, the destination of which is set to the IP address (20.0.0.01) of the PC 20, is transmitted from the VoIP communication corresponding counterpart terminal 31. The NAPT function of the PC 20 references the above described NAPT translation table, inversely translates the destination IP address and the destination port number into the IP address (10.0.0.1) and the port number of the cellular phone 10, and transfers the packet to the cellular phone 10.

In the implementation example 3, a communication device and a communication path, which differ by streaming, are selected as described above as shown in FIG. 14.

Implementation Example 4

A scenario assumed in this implementation example is that a user makes a videophone call with the cellular phone 10. In this implementation example, a communication device and a communication path are selected in units of flow types (voice and image flows), and a communication device and a communication path, which differ by flow type, are used.

This implementation example 4 assumes that the PC 20 does not have the transfer function of a communication packet, unlike the contents of [table 4]. This implementation example 4 also assumes a change in the state of a network (more specifically, a decrease in the intensity of radio waves transmitted from the cellular communication network 50) to be an environmental change in the cellular phone 10.

Results of selections of a communication device and a communication path, which are made in this implementation example in the communication system shown in FIG. 3, are depicted in FIG. 15. Process sequences in the cellular phone 10 and the PC 20 in this implementation example are described below. In this figure, a videophone communication corresponding counterpart terminal 33 is represented as the communication counterpart terminal 30 shown in FIG. 3, and a relay device 34 that is a home agent in MobileIP is represented on the IP network 40.

Initially, assume that a user makes a videophone call by using the cellular phone 10 via the cellular communication network 50.

Here, the cellular phone 10 that is a destination communication device detects a decrease in the intensity of radio waves coming from the cellular communication network 50 (S101 of FIG. 8). Then, the cellular phone 10 that detects this environmental change obtains information about the properties of the PC 20 by using the ad hoc mode of the wireless LAN function (S102). Next, the cellular phone 10 makes matching between the communication device properties of the PC 20 and the cellular phone 10 and the properties of the streaming application in a similar manner as in the other implementation examples (S103), and selects a communication device and a communication path, which are optimum for each flow type (S104 and S105).

For the voice flow, the cellular phone 10 is forced to be selected as a communication device because the PC 20 does not have a microphone as a voice input function (see [table 3] and [table 4]). Although the xDSL line 60 (ADSL line) is more advantageous as a communication path than the cellular communication network 50 in terms of a communication cost, the cellular communication network 50 is forced to be selected. This is because the PC 20 does not have the transfer function in this implementation example as described above.

In contrast, for the image flow, the PC 20 is selected as a communication device because the PC 20 is more advantageous as a communication device than the cellular phone 10 in terms of the size of a display for displaying an image. Additionally, the xDSL line 60 is selected as a communication path because the xDSL line 60 (ADSL line) is more advantageous than the cellular communication network 50 in terms of a communication cost.

In this implementation example, the determination processes are executed in the order of S111, S112, S121, S122, S123, S124, S125, S127 and S128 for the voice flow in the selection process shown in FIGS. 10A and 10B, and the selection results in S129 are obtained. In the meantime, the determination processes are executed in the order of S111, S112, S113, S114 and S115 for the image flow, and the selection results in S116 are obtained.

As described above, the "autonomous" communication paths are selected for both the voice and the image flows as described above in this implementation example.

The above described selection results are notified from the cellular phone 10 to the PC 20 (S106 and S107). The PC 20 that receives this notification activates a videophone application in order to receive the image flow (S201 and S202 of FIG. 10).

Additionally, the cellular phone 10 requests the relay device 34 to transfer the image flow to the PC 20 (20.0.0.1) at this time (S108 and S109 of FIG. 9).

A normal home agent transfers a communication packet, which was transmitted to the home agent (1.0.0.1) of a communication device, to a care-of address. However, the relay device 34 in this implementation example determines a care-of address by taking also information about a port number into account since the transfer destination of a communication packet is switched for each flow type. Namely, in this implementation example, location registration information, which is transmitted from the cellular phone 10 to the relay device 34, is made to include information about a port number, information about the home address of the cellular phone 10, and information indicating an association with a care-of address. The relay device 34 registers the location registration information to a table.

Thereafter, the relay device 34 distributes a communication packet to a destination of each flow type according to the above described table based on the destination IP address (home address) and the port number of the downstream communication packet transmitted from the videophone communication corresponding terminal 33. As a result, the voice flow is transferred to the cellular phone 10 via the cellular communication network 50, whereas the image flow is transferred to the PC 20 via the xDSL line 60.

In the implementation example 4, a communication device and a communication path, which vary by flow type, are selected as described above as shown in FIG. 15.

Up to this point, the implementation examples in which a communication device and a communication path are selected in the different selection units, namely, for each user, for each application, and for each flow type are described.

As described above, with the communication system for carrying out the present invention, not only is a communication device suitable for a user purpose selected but also an optimum communication path is selected in the communication system in which a plurality of communication devices are located in the neighborhood. This enables a plurality of network resources across communication devices to be effectively used. Here, an advantageous network is selected from among a plurality of network connections in terms of items such as a communication cost, a communication rate, a QoS function, the degree of network congestion, the quality of radio waves, and the like, whereby a low-price, high-speed and high-quality communication can be implemented.

The present invention is not limited to the above described implementation examples. Various improvements and modifications can be made within the scope that does not depart from the gist of the present invention.

What is claimed is:

1. A method for switching a communication in a communication made by a communication system having a plurality of communication devices, the method comprising:
    detecting an environmental change in a communication device by one of the plurality of communication devices, wherein all of a change in a neighboring communication device physically located in a neighborhood of the communication device that detects the environmental change, a change in a state of a communication network to which the communication device that detects the environmental change is connected, and a change in a state of an application running in the communication device that detects the environmental change can be detected in detection of the environmental change;
    making a selection of a communication path for use in a communication and a selection of one or more communication devices for use in the communication from the plurality of communication devices, by using the communication device that detects the environmental change; and
    switching a communication using only a destination communication device to a communication using a plurality of communication devices by distributing a plurality of communication packets, all of which are transmitted from a communication corresponding terminal and in all of which the destination communication device is indicated as a destination, to the destination communication device and a neighboring communication device physically located in a neighborhood of the destination communication device based on results of the selections.

2. The communication switching method according to claim 1, wherein
    the neighboring communication device is a communication device that can directly exchange a communication packet with the destination communication device.

3. The communication switching method according to claim 1, wherein
    the selections of the one or more communication devices and the communication path are made based on any one or more of a property of each communication device, a property of a communication network to which each communication device is connected, and a property of a communication application running in each communication device.

4. The communication switching method according to claim 3, wherein
    the property of each communication device includes any one or more of processing performance of each communication device, an input/output function comprised by each communication device, and a communication application installed in each communication device.

5. The communication switching method according to claim 3, wherein
    the property of the communication network to which each communication device is connected includes any one or more of a state of a connection to the communication network in each communication device, a communication cost when the communication network is used, a communication rate available to each communication device in the communication network, a state of a transfer path connecting each communication device and a communication network, and presence/absence of a transfer function of a communication packet in each communication device.

6. The communication switching method according to claim 3, wherein
    the property of the communication application running in each communication device includes any one or more of whether or not each flow type to be processed by the communication application can be played in each communication device, and a communication band required for the communication application.

7. The communication switching method according to claim 1, wherein
    in the communication using the plurality of communication devices, the neighboring communication device transfers the communication packet, which is distributed to the neighboring communication device, to the destination communication device.

8. The communication switching method according to claim 1, wherein
    in the communication using the plurality of communication devices, the neighboring communication device terminates the communication packet, which is distributed to the neighboring communication device and addressed to the destination communication device.

9. The communication switching method according to claim 1, wherein
    in the communication using the plurality of communication devices, the destination communication device transfers the communication packet, which is distributed to the destination communication device, to the neighboring communication device.

10. The communication switching method according to claim 1, wherein
    the selections of the one or more communication devices and the communication path are made for each user using each communication device, for each communication application, or for each flow type to be processed by each communication application.

11. The communication switching method according to claim 1, wherein
    the distribution of the communication packets is made by using a packet identifier indicated in the communication packets.

12. The communication switching method according to claim 11, wherein
    the distribution is made by using at least one or more of a layer 2 address, a layer 3 address, a port number, a QoS field, and a session ID, which are indicated in the communication packet, as the packet identifier.

13. A communication system having a plurality of communication devices, comprising:
    a detector which detects an environmental change in a communication device, wherein the detector can detect all of a change in a neighboring communication device physically located in a neighborhood of the communication device, a change in a state of a communication network to which the communication device is connected, and a change in a state of an application running in the communication device in detection of the environmental change;
    a selector which makes a selection of a communication path for use in a communication and a selection of one or more communication devices for use in the communication from the plurality of communication devices, according to detection of the environmental change; and a switch which switches a communication using only a destination communication device to a communication using a plurality of communication devices by distributing a plurality of communication packets, all of which are transmitted from a communication corresponding terminal and in all of which the destination communication device is indicated as a destination, to the destination communication device, and a neighboring communication device physically located in a neighborhood of the destination communication device based on results of the selections.

14. A communication device in a communication system having a plurality of communication devices, comprising:

a detector which detects an environmental change in a communication device, wherein the detector can detect all of a change in a neighboring communication device physically located in a neighborhood of the communication device, a change in a state of a communication network to which the communication device is connected, and a change in a state of an application running in the communication device in detection of the environmental change;

a selector which makes a selection of a communication path for use in a communication and a selection of one or more communication devices for use in the communication from the plurality of communication devices, according to detection of the environmental change; and a switching instructor which causes a communication using only a destination communication device to be switched to a communication using a plurality of communication devices by issuing an instruction to distribute a plurality of communication packets, all of which are transmitted from a communication corresponding terminal and in all of which the destination communication device is indicated as a destination, to the destination communication device, and a neighboring communication device physically located in a neighborhood of the destination communication device based on results of the selections.

* * * * *